(12) United States Patent
Drueke et al.

(10) Patent No.: US 9,991,689 B2
(45) Date of Patent: Jun. 5, 2018

(54) POWER PEDESTAL AND MOUNTING ASSEMBLY THEREFOR

(71) Applicant: EATON CORPORATION, Cleveland, OH (US)

(72) Inventors: Chris Emmons Drueke, Williamsburg, VA (US); Jeffery Scott Kuykendall, Williamsburg, VA (US); Paul David Seff, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days. days.

(21) Appl. No.: 14/971,301

(22) Filed: Dec. 16, 2015

(65) Prior Publication Data

US 2017/0179701 A1   Jun. 22, 2017

(51) Int. Cl.
*H02G 3/08* (2006.01)
*H02B 1/50* (2006.01)
*F16M 13/02* (2006.01)
*H02G 3/04* (2006.01)
*H02B 1/00* (2006.01)
*H02B 1/03* (2006.01)
*H02B 1/04* (2006.01)
*H02G 9/00* (2006.01)
*H02G 9/10* (2006.01)

(52) U.S. Cl.
CPC ............ *H02G 3/081* (2013.01); *F16M 13/02* (2013.01); *H02B 1/50* (2013.01); *H02G 3/0493* (2013.01); *H02G 3/083* (2013.01); H02B 1/00 (2013.01); H02B 1/03 (2013.01); H02B 1/04 (2013.01); H02G 9/00 (2013.01); H02G 9/10 (2013.01)

(58) Field of Classification Search
CPC ...... H02G 3/081; H02G 3/083; H02G 3/0493; H02G 9/00; H02G 9/10; F16M 13/02; H02B 1/00; H02B 1/03; H02B 1/04; H02B 1/50; H02B 1/505
See application file for complete search history.

(56) References Cited

U.S. PATENT DOCUMENTS

| 3,691,288 A * | 9/1972 | Sturdivan | H02B 1/50 174/38 |
| 3,753,047 A * | 8/1973 | Shallbetter | H02B 1/50 174/60 |
| 5,384,427 A * | 1/1995 | Volk | H02B 1/28 174/37 |
| 6,266,233 B1 * | 7/2001 | O'Regan | H02B 1/50 174/38 |
| 6,506,973 B1 * | 1/2003 | Howard | H02G 3/0493 174/493 |
| 6,742,748 B1 * | 6/2004 | Gretz | E04H 12/003 248/156 |

(Continued)

*Primary Examiner* — Ishwarbhai B Patel
*Assistant Examiner* — Paresh Paghadal
(74) *Attorney, Agent, or Firm* — Eckert Seamans

(57) ABSTRACT

A mounting assembly is for a power pedestal including a number of electrical components. The mounting assembly includes a plurality of mounting members including a first mounting member and a second mounting member each structured to engage an elongated support member and be coupled to the elongated support member. The elongated support member has an end portion. The plurality of mounting members are cooperatively structured to enclose the end portion.

20 Claims, 5 Drawing Sheets

(56) References Cited

U.S. PATENT DOCUMENTS

| | | | |
|---|---|---|---|
| 6,795,300 B1 * | 9/2004 | Holley | H02B 1/50 174/1 |
| 6,879,490 B2 * | 4/2005 | Mattei | H05K 7/06 361/726 |
| 6,897,490 B2 * | 5/2005 | Brunner | H01L 33/486 257/100 |
| 7,004,786 B1 | 2/2006 | Bloom et al. | |
| 7,570,481 B2 | 8/2009 | Seff et al. | |
| 7,807,924 B2 | 10/2010 | Wurzer | |
| 8,089,747 B2 | 1/2012 | Storck et al. | |
| 8,757,847 B2 | 6/2014 | Seff et al. | |
| 2007/0284370 A1 | 12/2007 | Dively | |
| 2008/0253061 A1 | 10/2008 | Seff et al. | |
| 2008/0304212 A1 | 12/2008 | Seff et al. | |
| 2010/0296230 A1 * | 11/2010 | Storck | B60L 11/1818 361/641 |
| 2011/0102975 A1 * | 5/2011 | Ranta | G01R 11/02 361/660 |
| 2013/0021721 A1 * | 1/2013 | Borden | H02B 1/50 361/622 |

* cited by examiner

POWER PEDESTAL AND MOUNTING ASSEMBLY THEREFOR

BACKGROUND

Field

The disclosed concept relates generally to outdoor electrical enclosures and, more particularly, to an outdoor electrical enclosure, such as an electrical power pedestal. The disclosed concept also relates to mounting assemblies for power pedestals.

Background Information

Electrical components (e.g., without limitation, receptacles, relays, circuit breakers, electrical meters, transformers, light fixtures, telephones, telephone and/or internet service lines, and television cables) used outdoors are typically housed within an enclosure, such as, for example, a power pedestal, to protect the electrical components from the environment and to prevent electrical faults caused by moisture. Power pedestals generally comprise an upstanding housing, the base of which is disposed on a suitable foundation (e.g., platform), and is structured to receive, for example and without limitation, power cables, telephone lines, television cables, internet service lines, and water service lines. The housing is made from a weather-resistant material, such as a suitable plastic or metal (e.g., without limitation, stainless steel), and is designed to enclose the power cables, lines and other cables, and the electrical components, receptacles and connectors which are electrically connected to the lines, in order to shield and protect them from the environment. Accordingly, power pedestals are well suited for use in environments such as marinas and recreational vehicle (RV) parks, where they must remain outdoors exposed to environmental elements as they serve to provide plug-in power and/or connectivity (e.g., without limitation, telephone service; Internet service; cable television; water service), for example, for boats and RVs and other vehicles.

In order to be mounted in, for example, an RV park, many known power pedestals have burial features that are connected to the housings of the power pedestals and are separately mounted in the ground. This typically requires significant time and labor to dig a hole and cement the burial feature to the ground. Additionally or alternatively, many known power pedestals also utilize pad mounts that are mounted to a cement pad in the RV park. However, not all RV parks have readily accessible cement pads to allow for such mounting.

There is, therefore, room for improvement in power pedestals and in mounting assemblies therefor.

SUMMARY

These needs and others are met by embodiments of the disclosed concept, which are directed to a power pedestal and mounting assembly therefor.

As one aspect of the disclosed concept, a mounting assembly for a power pedestal is provided. The power pedestal includes a number of electrical components. The mounting assembly comprises a plurality of mounting members comprising a first mounting member and a second mounting member each structured to engage an elongated support member and be coupled to the elongated support member, the elongated support member having an end portion. The plurality of mounting members are cooperatively structured to enclose the end portion.

As another aspect of the disclosed concept, a power pedestal comprises a mounting assembly comprising a plurality of mounting members comprising a first mounting member and a second mounting member each structured to engage an elongated support member and be coupled to the elongated support member, the elongated support member having an end portion; and a number of electrical components each coupled to at least one of the plurality of mounting members. The plurality of mounting members are cooperatively structured to enclose the end portion.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
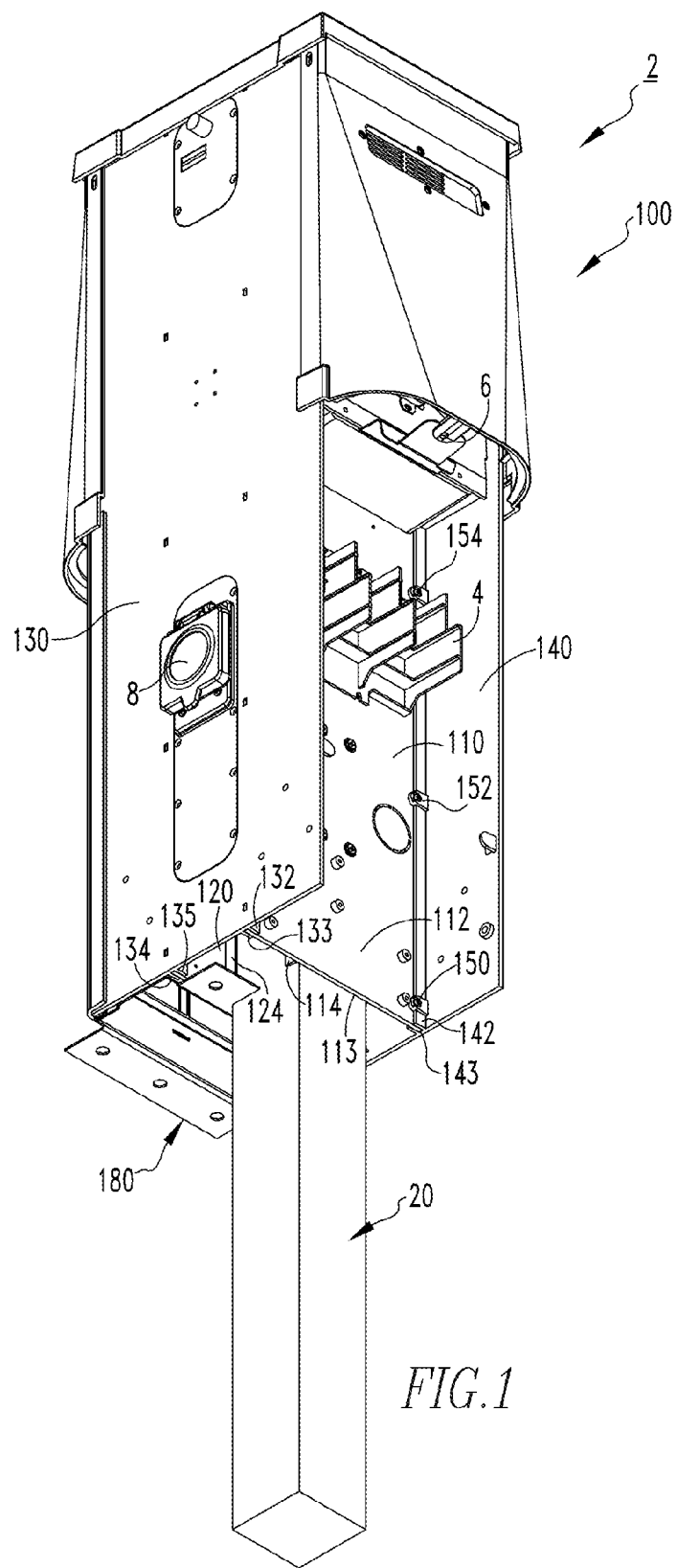
FIGS. 1 and 2 are bottom isometric and top isometric views, respectively, of a power pedestal and mounting assembly therefor, in accordance with a non-limiting embodiment of the disclosed concept.
Figure 2:
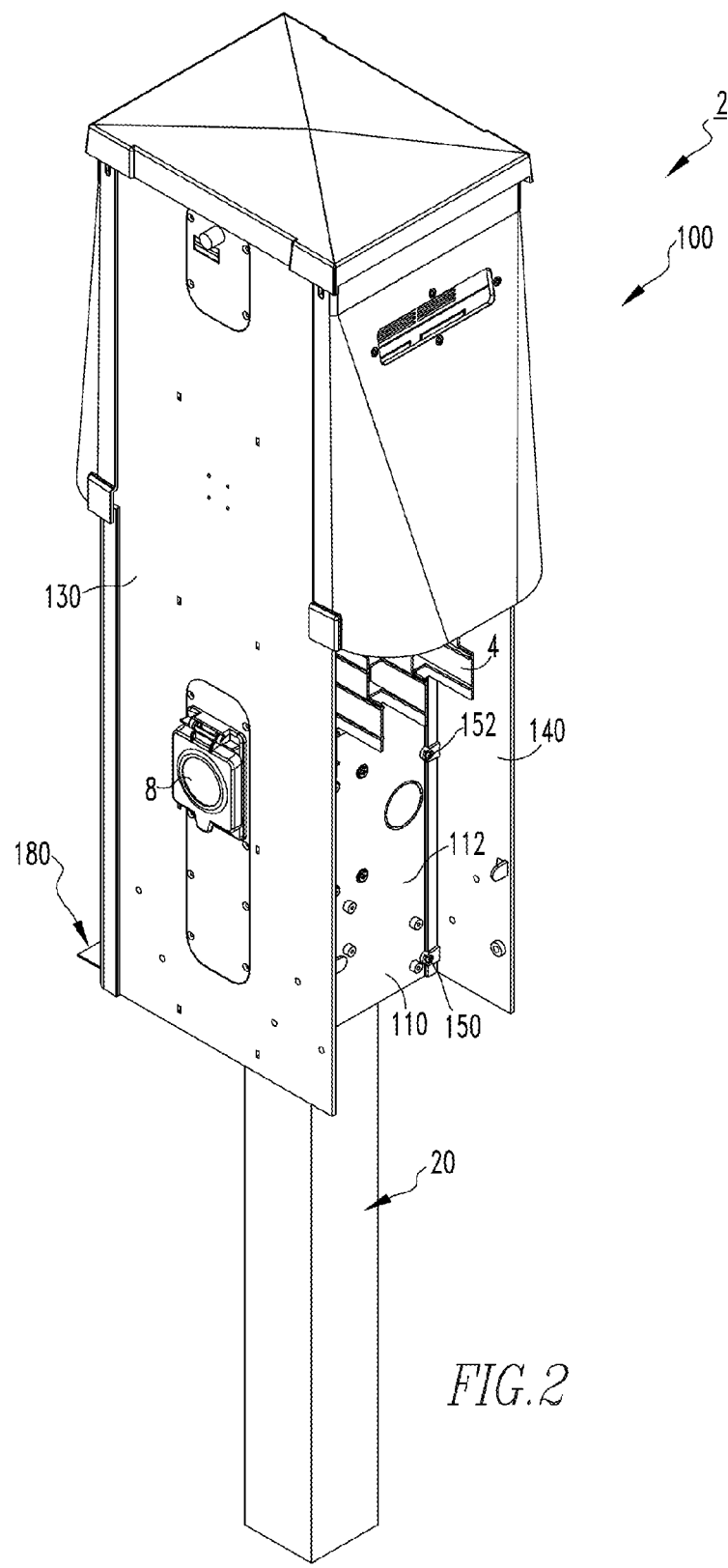

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the term "coupling member" refers to any suitable connecting or tightening mechanism expressly including, but not limited to, rivets, screws, bolts and the combinations of bolts and nuts (e.g., without limitation, lock nuts) and bolts, washers and nuts, zip ties, and wire ties.

FIGS. 1-6 show a power pedestal 2 in accordance with a non-limiting embodiment of the disclosed concept. The example power pedestal 2 includes a number of electrical components (e.g., without limitation, a bus bar holder 4, a number of electrical receptacles 6, and a telephone connection apparatus 8), a water dispensing apparatus 10, and a mounting assembly 100. The power pedestal 2 is suitable for use in an outdoor environment such as, for example, an RV park, in a manner wherein the electrical components 4,6,8 and the water dispensing apparatus 10 can interface with an RV (not shown). The mounting assembly 100 has a plurality of mounting members 110,120,130,140 coupled to one another, and the electrical components 4,6,8 and the water dispensing apparatus 10 are each coupled to at least one of the mounting members 110,120,130,140. In the exemplary embodiment, the mounting members 110,120,130,140 are components that are separately molded and subsequently coupled together.

As will be discussed in greater detail below, the power pedestal 2 is advantageously structured to be coupled to and mounted on an elongated support member (e.g., without limitation, post 20). The post 20 is preferably a pre-existing structure, such as, for example and without limitation, a post in an RV park that is made of wood. In this manner, the post 20 significantly reduces the need to employ separate installation equipment. In the exemplary embodiment, the post 20 is a standard four inch by four inch wooden post that is relatively rigid, thereby providing significant support and stability to the power pedestal 2, when installed. Utilizing the pre-existing post 20 significantly simplifies installation of the power pedestal 2 in that all that is required is aligning the mounting assembly 100 with the post 20 and coupling the mounting assembly 100 to the post 20 to provide stability and support. Accordingly, installation of the power pedestal 2 requires significantly less time, labor, and equipment, as compared to many known mounting methods.

In the exemplary embodiment, the mounting members 110,120, which each extend between and are perpendicular to the mounting members 130,140, are coupled to the mounting members 130,140 by employing a plurality of coupling members 150,152,154,156,158,160 and a slot mechanism. As shown in FIG. 1, the mounting members 130,140 each include a respective pair of elongated coupling portions 132,134,142 (only one of the two coupling portions 142 of the mounting member 140 is shown) each having a slot 133,135,143, and the mounting members 110,120 each extend into two opposing slots (see, for example, mounting member 110 within slots 133 and 143 in FIG. 1). The coupling members 150,152,154 extend through the coupling portion 142 and through the mounting member 110 in order to couple the mounting member 110 to the mounting member 140.

Figure 3:
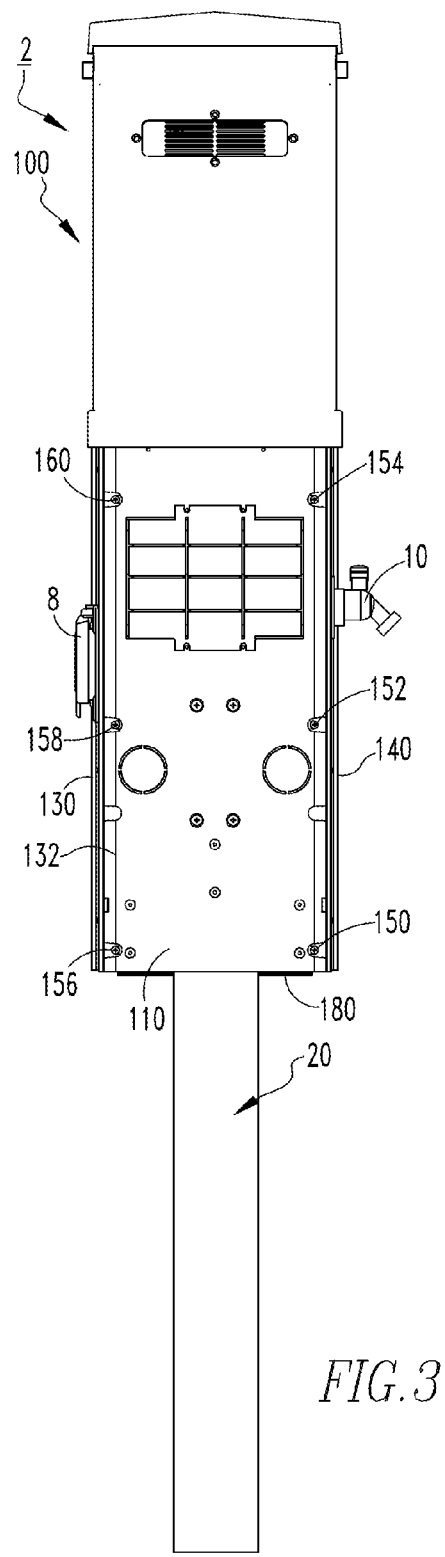
FIG. 3 is a side elevation view of the power pedestal and mounting assembly therefor of FIG. 1.
Figure 4:
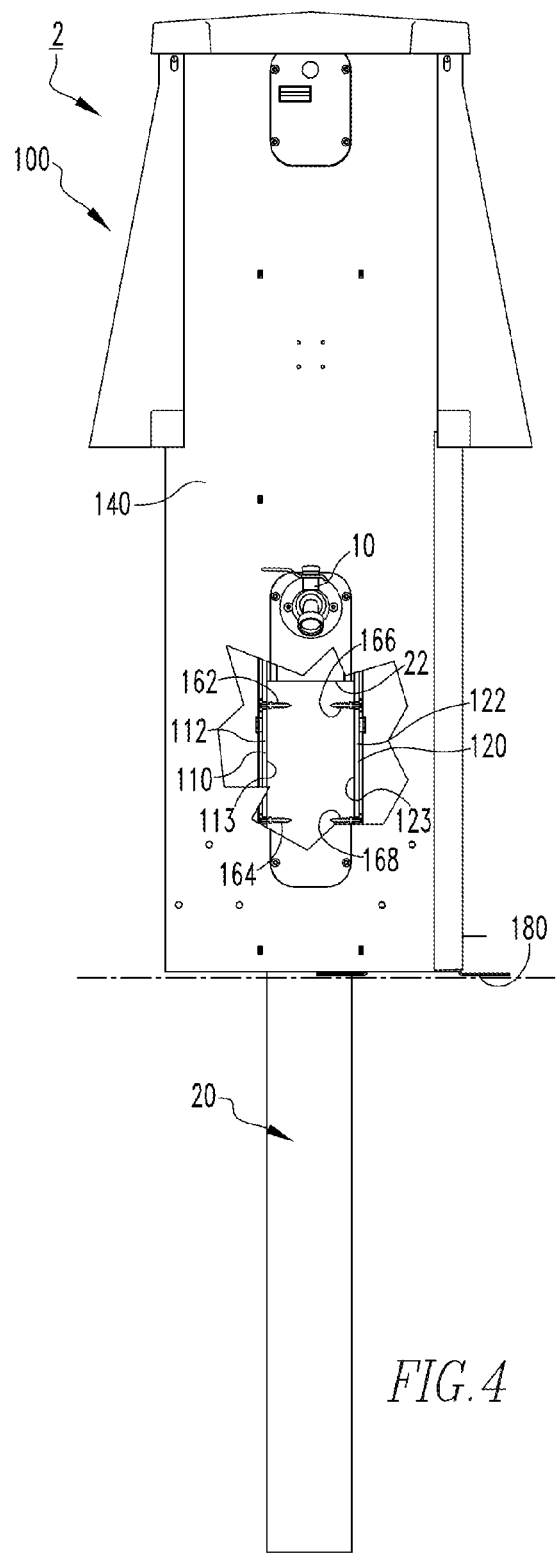
FIG. 4 is a front elevation view of the power pedestal and mounting assembly therefor of FIG. 1, partially cutaway in order to see internal structures.

Similarly, as shown in FIG. 3, the coupling members 156,158,160 extend through the coupling portion 132 and the mounting member 110 in order to couple the mounting member 110 to the mounting member 130. It will be appreciated that the mounting member 120 is coupled to the respective mounting members 130,140 in a similar fashion. The disclosed slot connection, in combination with the coupling members 150,152,154,156,158,160 advantageously ensures that the mounting members 110,120 are prevented from moving with respect to, or are fixed with respect to, the mounting members 130,140. It will, however, be appreciated that other suitable alternative connection mechanisms (not shown) may be employed to couple similar suitable alternative mounting members, without departing from the scope of the disclosed concept.

The mounting members 110,120 each include a number of respective walls 112,114,116,122,124 that engage the post 20 and maintain the power pedestal 2 in a relatively fixed orientation with respect to the post 20. The walls 112,114, 116, 122,124 engage and surround the primary four elongated surfaces of the post 20 such that the post 20 is prevented from moving laterally. More specifically, the walls 112,122 have inner surfaces 113,123 that are parallel to each other and engage opposing surfaces of the post 20. The walls 114,116,124 engage the other corresponding opposing surfaces of the post 20. Additionally, the walls 114,116 extend from and are perpendicular to the wall 112, and are each coplanar with a respective one of the walls 124 (and the other perpendicular wall of the mounting member 120). In this manner, the walls 112,114,116,122,124 advantageously ensure that the power pedestal 2 does not move laterally with respect to the post 20.

In order to prevent longitudinal movement of the power pedestal 2 with respect to the post 2, the mounting assembly 100 further includes a number of coupling members 162, 164,166,168. As shown in the cutaway view of FIG. 4 and the enlarged view of FIG. 5, the coupling members 162, 164,166,168 (e.g., without limitation, screws) each through a respective one of the mounting members 110,120 and into the post 20 in order to secure the mounting assembly 100 to the post 20. In this manner, the mounting members 110,120, together with the mounting members 130,140, cooperatively enclose an end portion 22 of the post 20. Furthermore, because the power pedestal 2 is firmly secured to the post 20, and the post 20 is firmly mounted into the ground such as, for example, by cement, the power pedestal 2 is likewise advantageously firmly mounted to the ground (partially shown in simplified form in phantom line drawing in FIG. 4).

Figure 5:
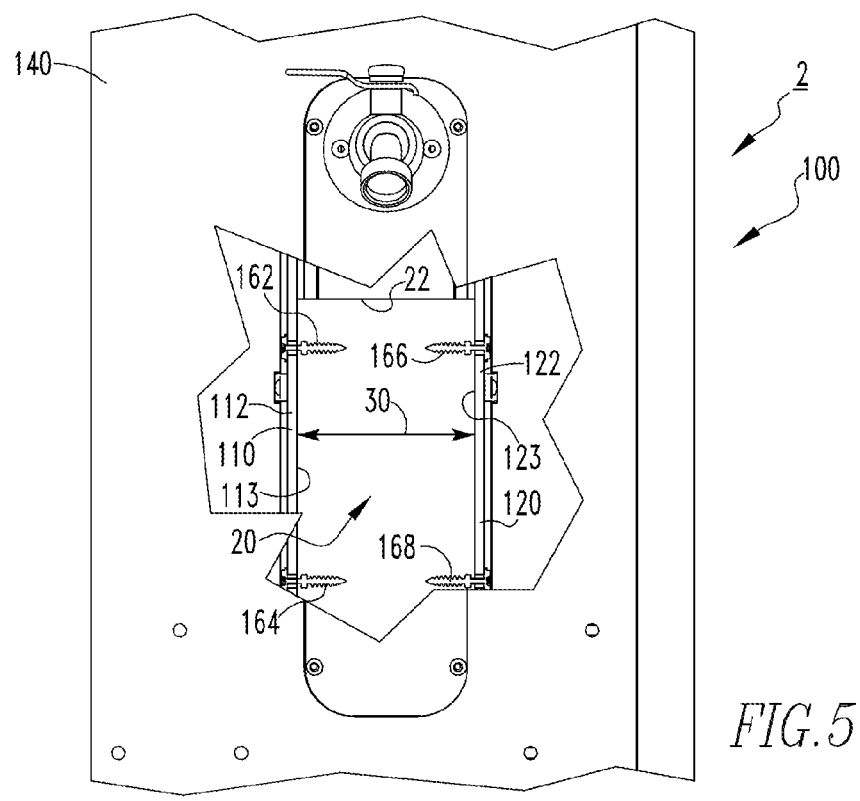
FIG. 5 is an enlarged view of a portion of the power pedestal and mounting assembly therefor of FIG. 4.
Figure 6:
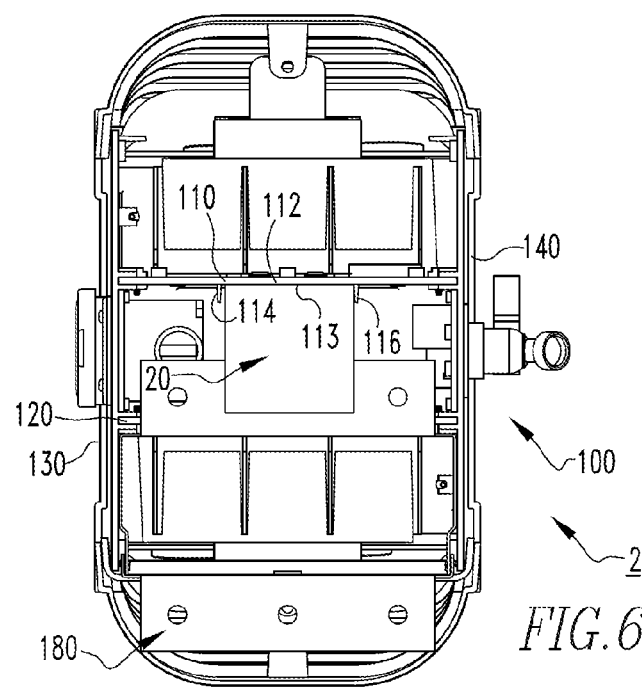
FIG. 6 is a bottom plan view of the power pedestal and mounting assembly therefor of FIG. 1.

Continuing to refer to FIG. 5, the inner surfaces 113,123 engage the post 20, and in the exemplary embodiment are spaced a distance 30 of between 3.4 inches and 3.8 inches from each other. Thus, the mounting assembly 100 is structured to be mounted to any suitable standard four inch by four inch post, such as those that are commonly found in RV parks. It will, however, be appreciated that similar suitable alternative mounting members (not shown) may have inner surfaces spaced different distances from each other in order to be mounted to suitable alternative sized posts, without departing from the scope of the disclosed concept. As a result of the novel mounting technique, additional mounting steps such as digging and cementing components into the ground are not necessary, as the power pedestal 2 is advantageously able to be mounted to existing structures such as the post 20, by simply mounting the power pedestal 2 on the post 20, and inserting the coupling members 162,164,166, 168 through the respective walls 112,122 and into the post 20.

Additionally, the mounting assembly 100 further includes a pad mount member 180 coupled to the mounting member 120. Thus in certain RV parks that include cement pads (not shown) for such mounting, the power pedestal 2 can be further supported by way of securing the pad mount member 180 to the cement pad (not shown), in addition to, or instead of, the separate mounting between the mounting assembly 100 and the post 20.

Figure 7:
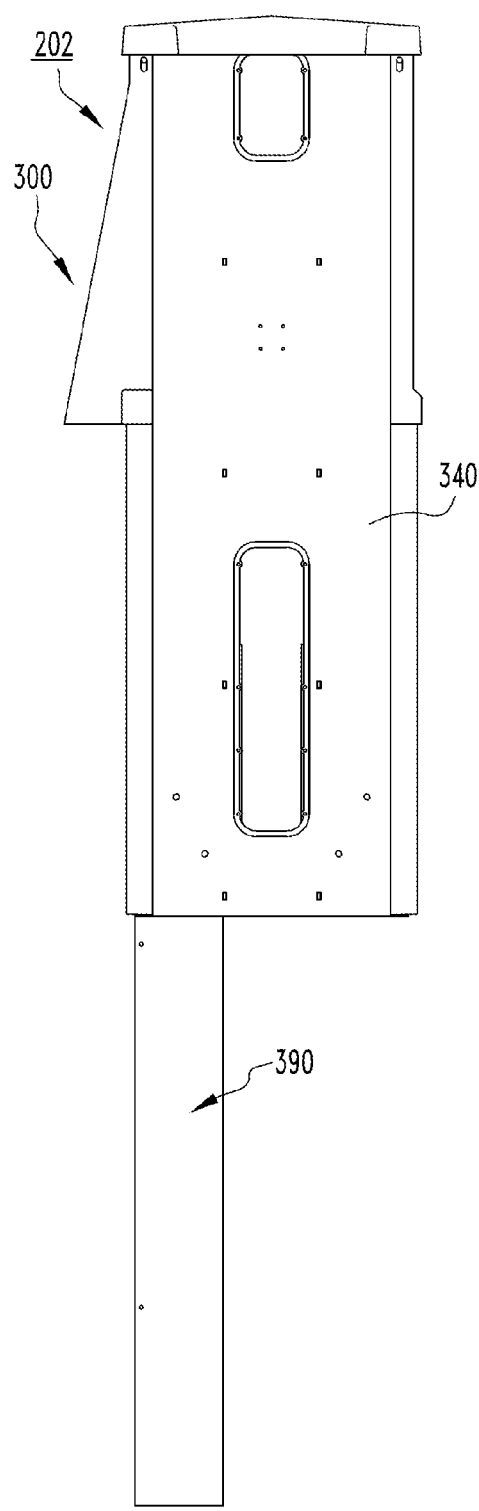
FIGS. 7 and 8 are front and side elevation views, respectively, of a power pedestal and mounting assembly therefor, in accordance with another non-limiting embodiment of the disclosed concept.
Figure 8:
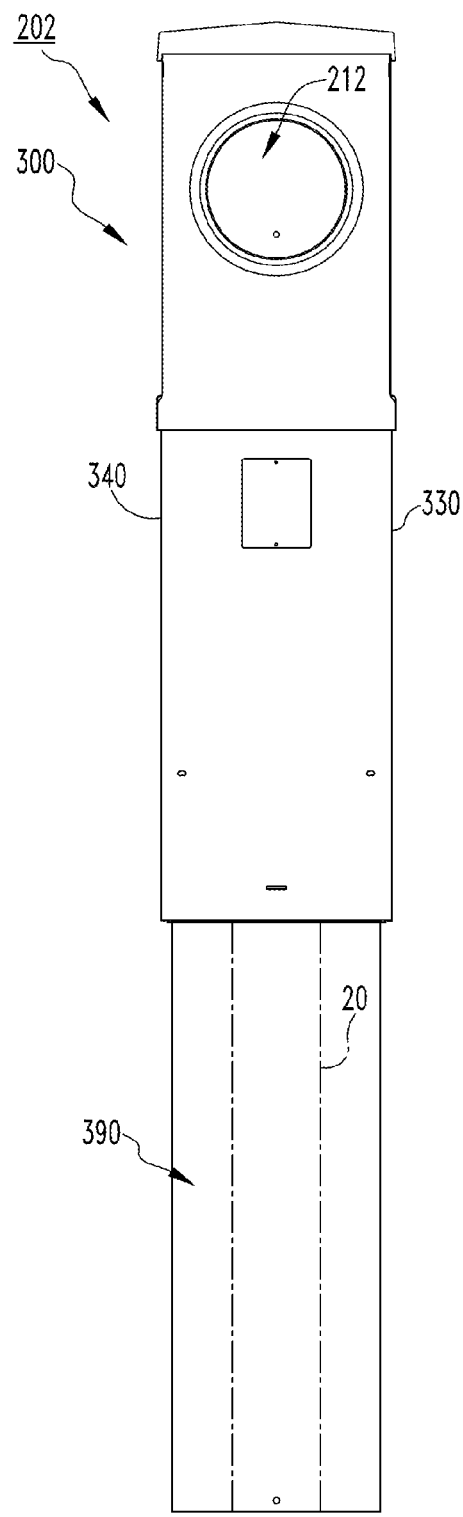

FIGS. 7 and 8 show another power pedestal 202 in accordance with another non-limiting example embodiment of the disclosed concept. The example power pedestal 202 is substantially the same as the power pedestal 2, and is likewise structured to be coupled to and mounted on an elongated support member such as the post 20. However, the power pedestal 202 includes a mounting assembly 300 having a burial member 390 extending between and being coupled to corresponding opposing mounting members 330, 340. The burial member 390 is structured to be elongated in a direction parallel to the post 20 (FIGS. 1-6) (also shown in phantom line drawing in FIG. 8). By employing the burial member 390, the power pedestal 202 is advantageously able to have greater support when mounted to the ground. Additionally, the burial member 390 provides beneficial protection for electrical wiring (not shown) being fed from the ground into the power pedestal 202. As shown in FIG. 8, the power pedestal 202 further includes a meter socket 212. Thus, it will be appreciated that similar suitable alternative power pedestals (not shown) may include any number, type, and/or configuration of components besides the configuration of the bus bar holder 4, the electrical receptacles 6, the telephone connection apparatus 8, the water dispensing apparatus 10, and the meter socket 212 in the power pedestals 2,202, without departing from the scope of the disclosed concept.

Accordingly, it will be appreciated that the disclosed concept provides for an improved (e.g., without limitation, easier to install and mount, more stable, better supported) power pedestal 2,202 and mounting assembly 100,300 therefor, in which a plurality of mounting members 110,120,130, 140,330,340 are cooperatively structured to enclose an end portion 22 of a post 20 that is preferably a pre-existing structure in an environment for desired use of the power pedestal 2,202 such as, for example and without limitation, an RV park.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A mounting assembly for a power pedestal including a number of electrical components, said mounting assembly comprising:
   a plurality of mounting members comprising a first mounting member and a second mounting member each structured to engage an elongated support member and be coupled to said elongated support member, said elongated support member having an end portion,
   wherein said plurality of mounting members are cooperatively structured to enclose the end portion; wherein each of said first mounting member and said second mounting member comprises a first wall, a second wall, and a third wall each structured to engage said elongated member; wherein said second wall and said third wall extend outwardly from said first wall and are disposed perpendicular to said first wall; wherein said plurality of mounting members further comprises a third mounting member and a fourth mounting member each coupled to said first mounting member and said second mounting member and being structured to be spaced from said elongated member; wherein each of said first mounting member and said second mounting member extends from said third mounting member to said fourth mounting member; wherein each of said second wall and said third wall of at least one of said first mounting member and said second mounting member is disposed in a corresponding plane; wherein the plane of said second wall and the plane of said third wall are each disposed between and are each parallel with respect to said third mounting member and said fourth mounting member; wherein the plane of said second wall is spaced a first distance from the plane of said third wall; wherein said third mounting member is spaced a second distance from said fourth mounting member; and wherein the second distance is greater than the first distance.

2. The mounting assembly of claim 1 wherein said first mounting member comprises a first inner surface structured to engage said elongated support member; wherein said second mounting member comprises a second inner surface structured to engage said elongated support member; and wherein said first inner surface is disposed parallel to said second inner surface.

3. The mounting assembly of claim 2 wherein said first inner surface is spaced between 3.4 inches and 3.8 inches from said second inner surface.

4. The mounting assembly of claim 1 wherein said second wall of said first mounting member is coplanar with said second wall of said second mounting member; and wherein said third wall of said first mounting member is coplanar with said third wall of said second mounting member.

5. The mounting assembly of claim 1 wherein said elongated support member is a rectangular-shaped post.

6. The mounting assembly of claim 5 wherein said post is made of wood.

7. The mounting assembly of claim 1 wherein said mounting assembly further comprises a first coupling member and a second coupling member; wherein said first coupling member extends through said first mounting member and is structured to extend into said support member; and wherein said second coupling member extends through said second mounting member and is structured to extend into said support member.

8. The mounting assembly of claim 1 wherein each of said first mounting member and said second member is disposed perpendicular to said third mounting member and said fourth mounting member.

9. The mounting assembly of claim 1 wherein said third mounting member comprises a first coupling portion and a second coupling portion each having a slot; wherein said first mounting member extends into the slot of said first coupling portion; wherein said second mounting member extends into the slot of said second coupling portion; wherein said mounting assembly further comprises a first coupling member and a second coupling member; wherein said first coupling member extends through each of said first coupling portion and said first mounting member in order to couple said first mounting member to said third mounting member; and wherein said second coupling member extends through each of said second coupling portion and said second mounting member in order to couple said second mounting member to said third mounting member.

10. The mounting assembly of claim 9 wherein said fourth mounting member comprises a third coupling portion and a fourth coupling portion each having a slot; wherein said first mounting member extends into the slot of said third coupling portion; wherein said second mounting member extends into the slot of said fourth coupling portion; wherein said mounting assembly further comprises a third coupling member and a fourth coupling member; wherein said third coupling member extends through each of said third coupling portion and said first mounting member in order to couple said first mounting member to said fourth mounting member; and wherein said fourth coupling member extends through each of said fourth coupling portion and said second mounting member in order to couple said second mounting member to said fourth mounting member.

11. The mounting assembly of claim 1 wherein said mounting assembly further comprises a burial member extending from said third mounting member to said fourth mounting member and being coupled to said third mounting member and said fourth mounting member; and wherein said burial member is elongated in a direction parallel to said support member.

12. The mounting assembly of claim 11 wherein said mounting assembly further comprises a pad mount member coupled to said second mounting member.

13. The mounting assembly of claim 1 wherein said first mounting member is separate and spaced from said second mounting member.

14. A power pedestal comprising:
a mounting assembly comprising:
- a plurality of mounting members comprising a first mounting member and a second mounting member each structured to engage an elongated support member and be coupled to said elongated support member, said elongated support member having an end portion; and
- a number of electrical components each coupled to at least one of said plurality of mounting members,
wherein said plurality of mounting members are cooperatively structured to enclose the end portion;
wherein each of said first mounting member and said second mounting member comprises a first wall, a second wall, and a third wall each structured to engage said elongated member; wherein said second wall and said third wall extend outwardly from said first wall and are disposed perpendicular to said first wall; wherein said plurality of mounting members further comprises a third mounting member and a fourth mounting member each coupled to said first mounting member and said second mounting member and being structured to be spaced from said elongated member; wherein each of said first mounting member and said second mounting member extends from said third mounting member to said fourth mounting member; wherein each of said second wall and said third wall of at least one of said first mounting member and said second mounting member is disposed in a corresponding plane; wherein the plane of said second wall and the plane of said third wall are each disposed between and are each parallel with respect to said third mounting member and said fourth mounting member; wherein the plane of said second wall is spaced a first distance from the plane of said third wall; wherein said third mounting member is spaced a second distance from said fourth mounting member; and wherein the second distance is greater than the first distance.

15. The power pedestal of claim 14 wherein said elongated support member is a rectangular-shaped post.

16. The power pedestal of claim 14 wherein said elongated support member is made of wood.

17. The power pedestal of claim 14 wherein said first wall of said first mounting member is spaced from and parallel to said first wall of said second mounting member; wherein said second wall of said first mounting member is spaced from and coplanar with said second wall of said second mounting member; and wherein said third wall of said first mounting member is spaced from and coplanar with said third wall of said second mounting member.

18. The power pedestal of claim 14 wherein said mounting assembly further comprises a burial member and a pad mount member; wherein said burial member extends from said third mounting member to said fourth mounting member; wherein said burial member is elongated in a direction parallel to said support member; and wherein said pad mount member is coupled to said second mounting member.

19. The power pedestal of claim 14 wherein said number of electrical components comprises a meter socket.

20. The power pedestal of claim 14 wherein said number of electrical components comprises at least one of a bus bar holder, a number of electrical receptacles, and a telephone connection apparatus.

\* \* \* \* \*